UNITED STATES PATENT OFFICE.

ARNOLD SCHEDLER, OF BASEL, SWITZERLAND, ASSIGNOR TO THE FIRM OF SOCIETY OF CHEMICAL INDUSTRY IN BASLE, OF BASEL, SWITZERLAND.

RED AZO DYE AND PROCESS OF MAKING SAME.

No. 837,736.  Specification of Letters Patent.  Patented Dec. 4, 1906.

Application filed June 5, 1906. Serial No. 320,286.

*To all whom it may concern:*

Be it known that I, ARNOLD SCHEDLER, chemist and doctor of philosophy, a citizen of the Swiss Republic, and a resident of Basel, Switzerland, have invented new and useful Red Azo Dyestuffs for Cotton and a Process for the Manufacture of the Same, of which the following is a full, clear, and exact specification.

The present invention is based upon the observation that the anhydroamidophenyl-diamido-naphtholsulfonic acid of the formula:

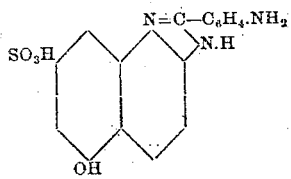

which may be obtained by condensation of nitrobenzoylchlorid or nitrobenzaldehyde with 1.2.diamido-5-naphthol-7-sulfonic acid and subsequent reduction, furnishes by its combination with aromatic diazo compounds in alkaline solution dyestuffs which are capable of being further diazotized and are transformed by combination of the thus obtained diazoazo bodies with suitable azo coloring-matter components, especially naphthol-sulfonic acids, into new dyestuffs, dyeing unmordanted cotton clear yellow-red to blue-red tints with a great fastness to light and acids.

The process for the manufacture of these dyestuffs is illustrated by the following example: 17.7 kilos of the above-named anhydroamidophenyl-diamido-naphtholsulfonic acid are dissolved in two hundred liters of water with fifteen kilos of calcinated sodium carbonate. The whole is cooled down with ice to about 5° centigrade, whereupon to the mass is added a diazo solution made in the usual way from 5.35 kilos of orthotoluidin, fifteen kilos of hydrochloric acid, and 3.5 kilos of sodium nitrite. The quickly-formed monoazo-dyestuff is neutralized by addition of a diluted solution of twenty kilos of hydrochloric acid. Then 3.6 kilos of sodium nitrite are added, and diazotization is made by throwing twenty kilos of hydrochloric acid into the mass and stirring during two hours. The thus obtained diazoazo compound is introduced into an alkaline solution of thirteen kilos of 1.4 naphtholsulfonate of soda, twenty kilos of sodium carbonate, and about two hundred liters of water. Afterward the whole is boiled up, the dyestuff is completely salted out, filtered, pressed, and dried. The dyestuff obtained constitutes in dry state a brown-red powder which dissolves in water with a red coloration and dyes unmordanted cotton red tints, which are very fast to light and acids. The dyestuff itself dissolves in concentrated sulfuric acid with a bluish-red shade and is reduced by the action of zinc-dust and ammonia to an amidonaphtholsulfo derivative, amidoanhydroamidophenyl-diamido-naphtholsulfonic acid and orthotoluidin.

In the foregoing example the orthotoluidin may be replaced by other amins and substitution products of them. Anilin gives, for example, a yellow-red, chloranilin a red, and xylidin and anisidin a blue-red shade. Likewise for the 1.4 naphtholsulfonic acid may be substituted another naphtholsulfonic acid—thus, for example, the 2.6 naphtholsulfonic acid, giving a more yellow-red, the 1.5 naphtholsulfonic acid furnishing a blue-red.

Generally the new dyestuffs dye unmordanted cotton clear red tints varying from yellow-red to blue-red, and they correspond to the formula:

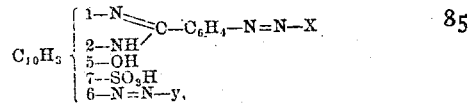

where X represents an azo coloring-matter component, and Y a diazo derivative of an aromatic amido compound.

What I claim is—

1. The herein-described process for the manufacture of red azo dyestuffs for cotton, which consists in coupling first anhydroamidoalphylacidyl-1.2-diamido-5-naphthol-7-sulfonic acid with one molecule of an aromatic diazo compound, then further diazotizing the resulting monoazo dyestuff with hydrochloric acid and nitrite and finally coupling it with an azo coloring-matter component.

2. The herein-described process for the manufacture of red azo dyestuffs for cotton, consisting in coupling first anhydroamidoalphylacidyl-1.2-diamido-5-naphthol-7-sulfonic acid with one molecule of an aromatic diazo compound, then further diazotizing the resulting monoazo dyestuff with hydrochloric acid and nitrite and finally coupling it with a naphtholsulfonic acid.

3. As new products, the azo dyestuffs of the general formula

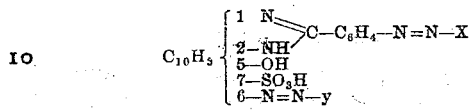

(where X represents an azo coloring-matter component and Y a diazo derivative of an aromatic amido compound,) which dye unmordanted cotton clear, red tints varying from yellow-red to blue-red, very fast to light and acids, and which are obtained by coupling first anhydroamidoalphylacidyl-1.2-diamido-5-naphthol-7-sulfonic acid with one molecule of an aromatic diazo compound, then further diazotizing the resulting monoazo dyestuff with hydrochloric acid and nitrite and finally coupling it with an azo coloring-matter component.

4. As a new article of manufacture, the herein-described azo dyestuff which is obtained by coupling one molecule of anhydroamidoalphylacidyl-1.2-diamido-5-naphthol-7-sulfonic acid with one molecule of diazotoluene, then further diazotizing the resulting monoazo dyestuff and finally coupling it with naphtholsulfonic acid, and which dyes unmordanted cotton red tints fast to acids and light and constitutes in a dry state a brown-red powder soluble in water with a red coloration and in concentrated sulfuric acid with a bluish-red shade.

In witness whereof I have hereunto signed my name, this 23d day of May, 1906, in the presence of two subscribing witnesses.

ARNOLD SCHEDLER.

Witnesses:
  GEO. GIFFORD,
  AMAND BRAUN.